Aug. 15, 1961     L. F. THIRY     2,996,311
INDEPENDENT WHEEL SUSPENSION FOR AUTOMOTIVE VEHICLE
Filed July 13, 1959     2 Sheets-Sheet 1
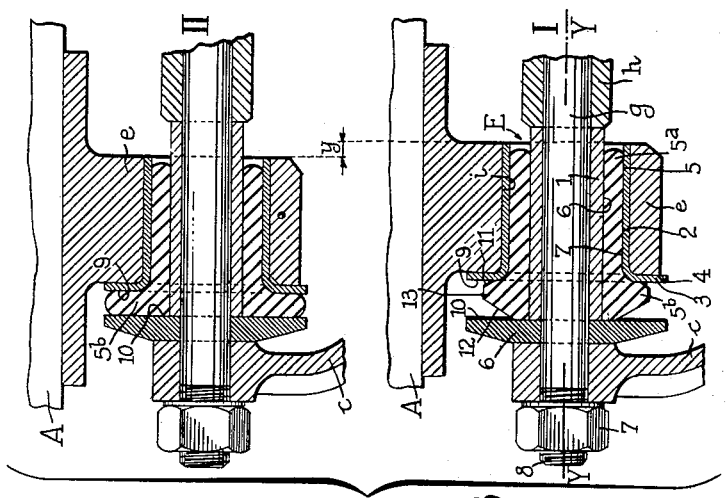
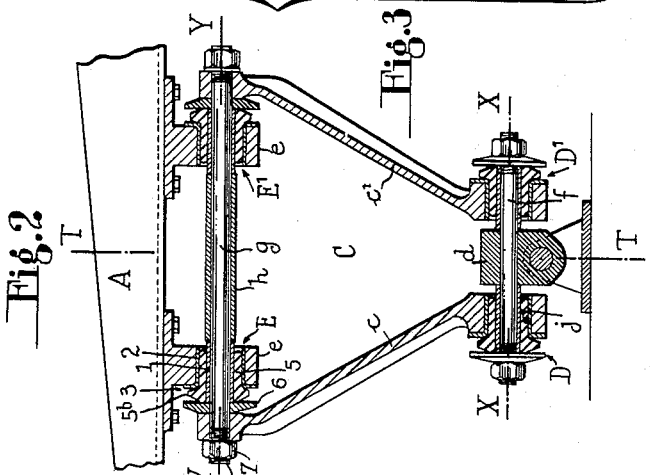
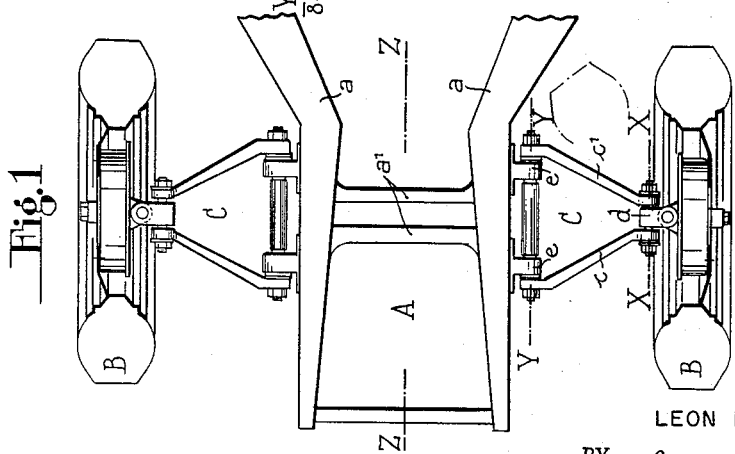
INVENTOR.
LEON F. THIRY
BY
*Hay & Hay*
ATTORNEYS Aug. 15, 1961   L. F. THIRY   2,996,311
INDEPENDENT WHEEL SUSPENSION FOR AUTOMOTIVE VEHICLE
Filed July 13, 1959   2 Sheets-Sheet 2
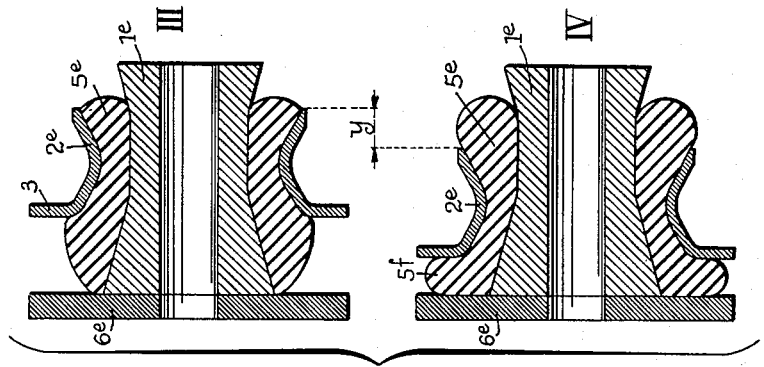
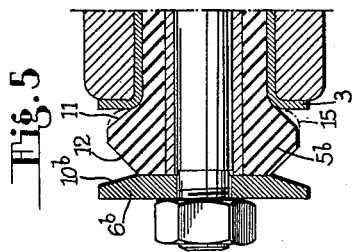
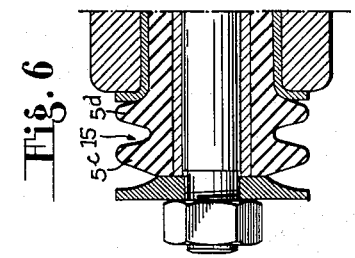
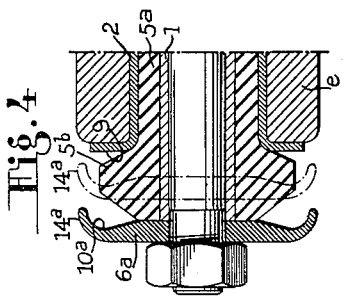
INVENTOR.
LEON F. THIRY
BY
*Fay & Fay*
ATTORNEYS United States Patent Office 2,996,311
Patented Aug. 15, 1961

2,996,311
INDEPENDENT WHEEL SUSPENSION FOR AUTOMOTIVE VEHICLE
Leon F. Thiry, 104 S. Franklin St., Chagrin Falls, Ohio
Filed July 13, 1959, Ser. No. 826,725
7 Claims. (Cl. 280—124)

This invention relates to independent front and/or rear wheel suspensions for automotive vehicles, and particularly to that type of suspension in which the wheel is connected to the chassis by rods or similar connecting parts, forming with each other a triangle, swingably mounted along one edge thereof to the chassis and at the apex to the wheel pivot around an axis parallel to the longitudinal axis of the vehicle. One at least of these two mountings or joints, comprises, as a liaison part, a sleeve of rubber or similar elastic material which is free to work elastically in torsion whenever the wheel moves upward in relation to the chassis, and at least one annular portion, which constitutes either a flange, continuous or not, on such sleeve, or an independent washer, and which operates as an axial elastic abutment during the relative longitudinal displacements of the wheel with respect to the chassis produced by accelerations, positive or negative, of the vehicle.

The modern automobile has wheels which readily yield in the vertical direction with respect to the body of the vehicle, thereby to give the occupant a soft, springy, damped ride in spite of the wheels bouncing up and down. However, substantially all road shocks include a horizontally directed shock component as well as the vertical shock component. Road discontinuities, such as expansion strips, raised railroad rails, and the like, are very abrupt and exert on the wheels of a rapidly moving vehicle a very sharp horizontal thrust. This horizontal thrust or acceleration is readily telegraphed to the driver through the front wheels in the steering mechanism, and it is apparent to all occupants due to transmission of the horizontal shock form all four wheels through the frame to the body of the car.

It is an object of the present invention to provide a wheel suspension system for vehicles wherein abrupt horizontal accelerations of the wheels, especially those due to road discontinuities, are prevented from being telegraphed to any large degree to the occupants of the vehicles.

The reduction in the horizontal shock component is achieved by a wheel suspension mechanism which includes one or more flanged rubber metal joints or mountings so oriented with respect to the direction of motion of the vehicle that vertical motions of the wheel with respect to the car body establish torsional forces in the joint which are elastically resisted and upon the wheel being rapidly accelerated in a horizontal direction due, i.e., to striking a raised obstruction on the road, to permit the wheel to move slightly in a horizontal direction with respect to the car body to elastically yield to the abrupt force created by such acceleration, thereby to reduce greatly the transmission of the shock forces to the vehicle occupants.

Normally, in suspension systems of the type previously described, one or more pairs of mountings or joints will be employed on the chassis side with each pair of such mountings being provided with a pair of oppositely disposed sleeves so that one or the other of the flanges on such sleeves takes part in the compression when the speed increases or decreases. On the wheel side one or more joints or mountings are generally employed with two oppositely disposed sleeves per mounting so that one or the other of the sleeve flanges is compressed according to whether the speed increases or decreases.

In conventional devices of this kind, the flanges have an axial cross-section which is more or less rectangular, and when at rest, these flanges are in contact at all points over their large flat surfaces with adjacent abutment surfaces, also flat and rigid, provided on metal parts between which the flange is disposed and which undergo a proportional axial displacement with changes in acceleration.

In many autos the flanges are subjected in assembling to a considerable original compression between these abutment surfaces. The result is that at the slightest oscillation, at least one of the flanges goes into action not only to reduce or eliminate elastically any possible axial displacement of the wheel with respect to the chassis, but also to create or substantially increase elastic resistance of the mounting or joint in torsion around its axis. This intervention of the elastic flanges increases the relative importance of these rubber-like sleeves as compared with that of the springs proper in the suspension of the vehicle.

In other words, if U is designated as the factor of the participation of these rubber sleeves or elastic joints in the vehicle suspension, and if V, is designated as the factor of the participation of the springs proper, the value of U and, consequently, the ratio of U to V is greatly increased by the action of these flanges. The practical effect of the law that "the resistance to torsion of an elastic joint created by any rubber element is proportional not to the distance of this element from the center of oscillation, but to the square of said distance," is that that portion of the flange situated radially outermost plays the major role in the torsion resistance of the joint.

The pronounced present-day trend in the automotive industry is to minimize the factor U discussed above. Many believe, in fact, that a large factor U tends to rob the suspension of a part of its softness, thereby creating a sensation described as feeling the pavement.

The analysis of this effect has still some obscure points and remains in dispute, but there is unanimity in the belief that it is advantageous to reduce this factor U as much as possible in the case of normal wheel movements and ordinary driving if the vehicle is to have the best riding comfort qualities. On the other hand, however, there would certainly be advantage in having a factor U as high as possible in the case of abnormally great shocks and emergencies such as violent braking, abrupt acceleration by sudden release of the clutch pedal, severe tilting sideways in turning at high speed, and the like, so as to reduce the raising and lowering of the chassis and the severe strain on the wheel pivots; in other words, to insure better stability in emergencies. The conventional joints with rectanguglar flanges or washers, although they fulfill the second of these requirements, do not completely satisfy the first.

The instant invention proposes to remedy this situation and relates to an independent wheel suspension for autos so improved that it provides the comfort or softness in normal operation which is given by a very flexible suspension. In addition to this desirable function, the invention imparts to the vehicle better performance when subjected on occasion to abrupt changes in speed or sudden starting and violent braking, as well as providing a better grip on the road when sudden changes in direction cause extreme tilting.

This improved suspension, which possesses, together with the comfort of a car having a very soft suspension, the better road holding and increased safety of the harder type of suspension, is of the type hereinabove mentioned which includes an elastic sleeve substantially horizontal and parallel to the longitudinal axis of the vehicle. It includes at least a flange or washer, continuous or not, constructed from rubber or similar elastic material and disposed between two rigid abutment members, movable axially one relative to the other under the influence of axial thrusts.

The invention is particularly distinctive in that the flange or washer of at least one of the elastic sleeves and the rigid adjacent abutment surfaces have such shapes that at rest or in the substantially uncompressed state, the flange or washer contacts these abutment surfaces only over a reduced area situated as near as possible to the axis of oscillation. Under compression, the contact area increases progressively radially outwardly from the axis of oscillation to the periphery of the flange or washer. It is understood, of course, that the compression of the flange results from the relative displacement of the abutment surfaces with respect both to the flange and to each other.

Due to this arrangement, the resistance of the sleeve to couples of oscillation acting around the axis thereof is very small when the flange is uncompressed or only slightly compressed between the abutment surfaces. When, however, the abutment surfaces between which the flange is housed are subjected to movement by the influence of horizontal thrusts exerted upon the wheels, the area contact of the flange with the abutment increases slowly thereby to increase the resistance of the sleeve to oscillation around the axis thereof. Under the influence of very high horizontal thrusts, the entire face of the flange comes into contact with the adjacent abutment surface thereby to create a maximum amount of torsional resistance to oscillation.

It is, therefore, a further object of this invention to provide an elastic sleeve equipped with a washer or flange which is so designed as to inject a varying amount of influence into the suspension system of a vehicle.

An even further object of this invention is to provide an elastic sleeve which is equipped with a flange or washer which decreases in axial thickness radially outwardly of the sleeve.

Still another object of the invention is to provide an automotive vehicle in which at least the front wheels thereof are equipped with independent suspension of this improved type.

Other objects and advantages will be apparent from the detailed description to follow.

In the drawings:

FIG. 1 is a schematic plan view of the frame of the vehicle chassis with independent wheel suspension to which the invention is applied.

FIG. 2 is a horizontal view, partly in longitudinal section, of one of the two devices of suspension at a greater scale than FIG. 1.

FIG. 3 is an enlarged view, partly in longitudinal section, of a portion of FIG. 2 and showing in Part 1 thereof the elastic sleeve and the flange in a substantially uncompressed state. Part 2 shows the flange under a substantial compression.

FIG. 4 is a view, partly in longitudinal section and in enlarged scale, of a modified form of the invention and in which one of the abutment members is provided with a peripheral flange.

FIG. 5 is a view, partly in longitudinal section, of a further modification of the invention showing one of the abutment members being provided with a conical surface.

FIG. 6 is a view, partly in longitudinal section, of still another embodiment of the invention and showing a modified flange formation and a modified abutment member.

FIG. 7 shows still another embodiment of the invention in longitudinal section including a modified abutment member and flange formation. Part 3 of FIG. 7 shows the elastic sleeve in the unstressed condition of the flange, while Part 4 of FIG. 7 shows the flange under a substantial pressure.

Referring now more particularly to the drawings under the example or realization of the invention shown in FIGS. 1–4, a schematic representation of the front end suspension of an automotive vehicle is shown and includes the side frame member $a$ and the transverse frame member $a^1$ of the suspended chassis A. Independently suspended wheels B are connected to the chassis by means of suspension device C. Each of these devices is of the previously known type including two superposed pairs of tie rods $c$ and $c^1$ which extend divergently from the kingpin $d$ of the wheel so as to form with each other a V, the rods being the two branches of the V.

Rods $c$ and $c^1$ are pivotally mounted on the kingpin $d$ of the wheel and on parts forming bearings $e$, rigidly attached to the side frame member $a$ by pivots $f$ and $g$ with the axis X—X of the pivot $f$ and Y—Y of the pivot $g$ being substantially horizontal and parallel to the longitudinal axis Z—Z of symmetry of the vehicle. Interposed between the bearings $e$ and the pivot $g$ and between the rods $c$ and $c^1$ and the pivot $f$ are elastic articulation devices D, $D^1$, E, and $E^1$.

Each articulation device comprises an internal metallic sleeve 1 as seen in FIG. 3. One of these articulation devices consists of an internal metallic sleeve 1 mounted on the pivot $g$ and in abutment with an intermediate spacing sleeve $h$. An outer metallic sleeve 2 is positioned within a bore $i$ formed in metal part $e$ and is provided at one end thereof with a flange or collar 3 resting against the lateral face 4 of the part $e$ and oriented towards the front of the vehicle, i.e., to the left as viewed in FIG. 3. An elastic sleeve 5 is provided with a more or less cylindrical body portion 5$a$ which is disposed between the outside surface 6 of the internal sleeve 1 and the inside surface 7 of the external sleeve 2, and which is in a substantial degree of axial elongation and radial compression when positioned between the surfaces. A flange 5$b$ is provided on an end portion of the elastic sleeve and extends radially outwardly from an extended portion of the internal sleeve 1 and beyond the diameter of the outer sleeve 2. An abutment washer 6 is maintained against the adjacent face of the internal sleeve 1 by means of connecting rod $c$ and nut 7 which is threadedly connected with the extremity 8 of pivot member $g$.

The assembly described thus far is known in itself, but in the conventional assembly the flange 5$b$ has a diametrical axial section of substantially rectangular shape and in contact, when the wheels are not subjected to horizontal thrusts, with the adjacent surfaces 9 of the flange 3 and 10 of the washer 6 throughout the entire area of the faces of the flange. According to the present invention, the surfaces 9 and 10 and/or the corresponding surfaces 11 and 12 of the flange 5$b$ are so shaped that, in the absence of horizontal thrusts on the wheels, the portion of the space provided between the surfaces 9 and 10 decreases from the axis Y—Y towards the peripheral edge 13 of the flange as viewed in each radial plane passing through the axis Y—Y of oscillation.

One of the ways by which this particular formation may be obtained is to construct the surfaces 9 and 10 in planes substantially perpendicular to the axis Y—Y while at the same time forming at least one of the surfaces 11 and 12 of the flange 5$b$ as a frusto-cone or the like. In FIG. 3, for example, the flange 5$b$ is shown as being formed in part by surfaces 11 and 12 of frusto-conical configuration, closing in opposite directions with the apices thereof situated generally along the axis Y—Y.

When the wheel B sustains a change in elevation in relation to the chassis A, and when the wheel B is not under the influence of horizontal thrusts, the connecting rods $c$ and $c^1$ oscillate around the axes X—X and Y—Y in relation to the wheel B and to the chassis C. In the course of these oscillations, the body portion 5$a$ of the sleeve 5 works in torsion and the resulting factor $U_o$ has a small value, and regardless of the factor V resulting from the springs proper, the ratio $U_o$ to V is small. Naturally, the factor U increases in magnitude from $U_o$ with the movement of the wheel, but such factor will always remain relatively small and can be considered as such in relation to the factor V even in the case of a suspension of very soft type.

During this movement of the wheel without horizontal thrust thereon, the flange 5b of the elastic sleeve 5 remains under but slight compression and the surfaces 11 and 12 thereof remain free of contact with the opposing abutment surfaces 9 and 10 throughout a major portion of their areas. For this reason, the flange 5b of each sleeve 5 has no marked participation in the suspension of the wheel and the factor $U_o$ is solely due to the torsion in the body portion 5a of the sleeve.

On the other hand, however, when the vehicle is submitted to positive or negative accelerations, for example, the chassis A moves forwardly or rearwardly with respect to the rods c and $c^1$, depending upon whether the acceleration is positive or negative. The amount of this motion is, of course, dependent upon the particular magnitude of the acceleration and the greater the amount of the acceleration, the greater the magnitude of this motion. From this action, in the event this acceleration is positive, for example, the flanges 5b of the front devices D and E are gradually compressed between the rigid surfaces 9 and 10 of the part 3 and the washer 6 correspondingly. This compression brings the frusto-conical faces 11 and 12 of the flange 5b into contact with the surfaces 9 and 10 in increasing quantity when the relative axial displacement between the inner sleeve 1 and the outer sleeve 6 attached to the chassis A and the wheel B respectively is greater.

For each value of acceleration a corresponding portion of the surfaces 11 and 12 of the flange 5b provided on articulation devices D and E or on articulation devices $D^1$ and $E^1$ is brought into contact with the rigid abutment surfaces 9 and 10. The radial width of such area of contact being much larger when the acceleration is high. For small accelerations, the factor U takes a value superior to $U_o$, but still small enough to exert little or no influence on the softness of the suspension. During periods of great acceleration, with a resulting large amount of relative longitudinal displacement between the sleeves 1 and 2, the collar 5b may be so highly compressed as to bring the faces 11 and 12 thereof into complete area contact with the abutment surfaces 9 and 10 as shown, for example, in FIG. 3, position II. At this point, the value of $U_m$ is relatively high and the resultant ratio of $U_m$ to V takes on an important value. The practical effect of this is to harden the suspension and thereby contribute to the avoidance of excessive wheel displacements due to hard braking, for example, which would put the front devices D and E into operation, or due to rapid acceleration which would put the rear devices $E^1$ and $E^2$ into action, or in the case of a marked change of direction.

It will be noticed that the variation ($U_m$—$U_o$) of the intervention factor, due to the work in torsion of the flange 5b, can be made even more important by increasing the dimensions of the flange over those which would be sufficient to resist the horizontal thrust encountered during normal cruising without producing any increased hardness of ride as a result of an increase in the U factor.

Thus, it can be seen that the provision of an elastic flange of the type discussed can be the source of vast differences in operation as compared to the conventional flanges of rectangular shape in section. In elastic sleeves which employ flanges of this conventional design, the maximum factor $U_m$ is present when accelerations are either non-existent or very small in value. This, of course, harms the quality of the suspension during normal cruising.

It will be understood, of course, that the clearance existing between the flange 5b and the abutment surfaces of a suspension involving this invention can be defined by both faces of the flange or between one face only and its adjacent abutment surface. This clearance may be obtained by a variety of different flange face and abutment face designs as, for example, by forming faces 9 and 10 flat and perpendicular to the axis of oscillation, and by providing in co-operation with such faces, a flange having one face frusto-conical in form. As shown in FIG. 4 one of the abutment surfaces as, for example, the surface on washer 6a may be made with a concave configuration, thereby increasing the clearance between this surface and the adjacent flange face, progressively from the axis of oscillation to the periphery of the flange 5b. In addition, in the embodiment of FIG. 4 the marginal edge or rim of the washer has been curved as at 14a so that in the position of maximum axial displacement the rim may act to confine the flange 5b thereby preventing a radially outward flow thereof under abnormally high horizontal thrusts. It can be seen that in this particular embodiment the increase in diameter of the flange 5b is thereby limited so as to create an efficient resistance to the effects of maximum axial thrusts.

In alternate form, instead of curving the marginal portions of the washer 6a to constitute an encasing member for the periphery of the flange 5b, the conicity of the washer could be reversed at a certain distance from the axis of oscillation to create an encasing member which under the action of a radial component directed towards the axis would effect a constrainment which would efficiently oppose undue outward expansion of the flange, but, in a somewhat less harsh manner.

As seen in FIG. 5, the clearance between the flange at rest and a corresponding abutment surface 10b can be increased by giving to such surface a configuration which diverges in a direction away from the face 12 of the flange 5b. The flange 5b could also be formed by a pair of frusto-conical surfaces 11 and 12, as in the first example one being more or less in contact in the rest position thereof with the part 3 as shown, for example, by dotted line 15 in FIG. 5.

FIG. 6 shows a modified form of the invention in which the elastic flange may be made somewhat more deformable than the flange of previously described modifications as by the provision of one or more cavities, extending to the periphery of the flange or not, as desired, and as indicated at 15 in FIG. 6. Such a cavity may produce a pair of flanges 5c and 5d.

In all of the preceding examples, the elastic sleeve may be attached to the co-axial sleeves 1 and 2 by any of the known means or methods. A particularly satisfactory way of making such attachment is by means of deformation of the body portion 5a of the sleeve either by the decrease of its radial thickness accompanied by a circular and/or axial elongation as the portion 5a is forced between the inner and outer sleeves 1 and 3 respectively. Other means for making the attachment may include vulcanization, adhesives, and the like.

The invention is considered also to extend to articulation devices similar to the one described in which the adherence of the rubber sleeve to one or both of the sleeves between which it is disposed is eliminated, there being provided a lubricant film such as a silicone or the like between the contact surfaces, the same being maintained against escape by end seals which also keep out foreign bodies, such as water, dust, and the like. The zone so lubricated can extend to a part of the flange on its adjacent lateral face and even to a part of its outside face. This alternative articulation is lubricated during the entire life of the vehicle and, as a result, the factor U of the lubricated portion is reduced due to the fact that such portion does not sustain any torsion.

In the various types of articulation envisioned up to now, it is obvious that the flange could, if desired, be made of several portions situated around the extended part of the sleeve and circumferentially separated from each other. In addition, in all of these examples, it would be possible to form the flange as a separate collar instead of as an integral part of the sleeve. In all cases, it is advisable to provide a limit for the axial flexibility of the mounting in order to avoid destruction of the cylindrical parts of the sleeve by shear in cases where the sleeve is attached to the inner and outer sleeves 1 and 3 respectively or to other similar parts.

With respect to the articulation which features a permanent lubrication, caution must be exerted in order to insure the fact that the end seals do not interfere with the pumping action resulting from the oscillatory movement of the wheels. Practice has shown, however, that even while complying with this requirement the instant invention permits a very efficient result.

In the embodiment of FIG. 7 is shown an articulation of modified form. By comparing the articulation in the rest position III and in the extreme position IV, it will be noted that under the influence of a strong axial thrust, an axial displacement $y$ has been created between the internal part $1^e$ and the outer part $2^e$. It can also be seen that this displacement has created a rolling action of the sleeve $5^e$ which results in the progressive formation of a massive flange $5^f$ between the flange 3 and the washer $6^e$ and which flange $5^f$ is initially of very small radial magnitude as seen in the rest position 3. The metallic inner and outer tubes $1^e$ and $2^e$ are constructed in the form of hyperboloids in order to cause the efficient radially outward rolling action previously described.

While the invention has been illustrated as being included in several specific embodiments for the purpose of simplicity of description, it will be immediately obvious to one of ordinary skill in the art that there are numerous modifications which could be made to the structure of the invention without departing from the spirit thereof. It is, therefore, my desire to be limited only by the scope of the appended claims.

I claim:

1. In an independent wheel suspension system including one frame-like member having carried thereon another frame-like member subject to multidirectional intermittent shock loadings, a pair of coaxially aligned bushings pivotally mounting the one frame-like member to the other with the common axis of the bushings forming the axis of pivot of the one frame-like member with respect to the other, each bushing including an outer member providing an outer surface of revolution and carried upon the one frame-like member, an inner member providing an inner surface of revolution and carried upon the outer frame-like member, an annular rubberlike sleeve between the inner and outer surfaces of revolution and substantially filling the space therebetween, an annular, radially outwardly extending elastic flange at one end portion of the rubberlike sleeve, a pair of abutment surfaces provided for the elastic flange of each bushing, the abutment surfaces of each pair lying in spaced surfaces disposed along the pivotal axis and extending transversely thereof, one of the abutment surfaces of each pair being carried on one frame-like member and the other being carried on the other frame-like member, the abutment surfaces of each pair being movable toward one another, each of the elastic flanges being confined between the abutment surfaces comprising one of the pairs thereof, the mass of each flange being progressively decreased in one direction along the radius thereof, and the bushings being oppositely oriented so that a thrust of progressively increasing magnitude applied to one of the frame-like members in one direction along the pivotal axis will cause the compression, between one pair of abutment surfaces, of a progressively increasing mass of one of the flanges, and a similar thrust applied in the other direction will cause the similar compression, between the other pair of abutment surfaces, of the other of the flanges.

2. Structure as defined in claim 1 in which each flange contacts at least one of the abutment surfaces adjacent thereto over an area located close to the pivotal axis when the system is subject to negligible thrust along the pivotal axis.

3. Structure as defined in claim 1 in which at least one lateral face of at least one flange diverges with respect to the abutment surface adjacent thereto.

4. In a suspension system including one frame-like member having carried thereon another frame-like member subject to multidirectional intermittent shock loadings, a pair of coaxially aligned bushings pivotally mounting the one frame-like member to the other with the common axis of the bushings forming the axis of pivot of the one frame-like member with respect to the other, each bushing including an outer member providing an outer surface of revolution and carried upon the one frame-like member, an inner member providing an inner surface of revolution and carried upon the outer frame-like member, an annular rubberlike sleeve between the inner and outer surfaces of revolution and substantially filling the space therebetween, an annular, radially outwardly extending elastic flange at one end portion of the rubberlike sleeve, a pair of abutment surfaces provided for the elastic flange of each bushing, the abutment surfaces of each pair lying in spaced surfaces disposed along the pivotal axis and extending transversely thereof, one of the abutment surfaces of each pair being carried on one frame-like member and the other being carried on the other frame like member, the abutment surfaces of each pair being movable toward one another, each of the elastic flanges being confined between the abutment surfaces comprising one of the pairs thereof, and means progressively to increase the area of contact between at least one lateral face of one flange and the abutment surface adjacent thereto when thrust of progressively increasing magnitude is applied to one of the frame-like members in one direction along the pivotal axis, and progressively to increase the area of contact between at least one lateral face of the other flange and the abutment surface adjacent thereto when a similar thrust is applied in the other direction.

5. Structure as defined in claim 4 in which said lateral faces of the flanges are initially in contact, over a limited area, with the abutment surfaces adjacent thereto.

6. In an independent wheel suspension system for an automotive vehicle, one frame-like member having carried thereon another frame-like member subject to multidirectional intermittent shock loadings, a pair of coaxially aligned bushings pivotally mounting the one frame-like member to the other with the common axis of the bushings being generally parallel to the longitudinal axis of the vehicle and forming the axis of pivot of the one frame-like member with respect to the other, each bushing including an outer member providing an outer surface of revolution and carried upon the one frame-like member, an inner member providing an inner surface of revolution and carried upon the outer frame-like member, an annular rubberlike sleeve between the inner and outer surfaces of revolution and substantially filling the space therebetween, an annular, radially outwardly extending elastic flange at one end portion of the rubberlike sleeve, a pair of abutment surfaces provided for the elastic flange of each bushing, the abutment surfaces of each pair lying in spaced surfaces disposed along the pivotal axis and extending transversely thereof, one of the abutment surfaces of each pair being carried on one frame-like member and the other being carried on the other frame-like member, the abutment surfaces of each pair being movable toward one another, each of the elastic flanges being confined between the abutment surfaces comprising one of the pairs thereof, the mass of each flange being progressively decreased in one direction along the radius thereof, and the bushings being oppositely oriented so that a thrust of progressively increasing magnitude applied to one of the frame-like members in one direction along the pivotal axis will cause the compression, between one pair of abutment surfaces, of a progressively increasing mass of one of the flanges, and a similar thrust applied on the other direction will cause the similar compression, between the other pair of abutment surfaces, of the other of the flanges.

7. Structure as defined in claim 1 in which each flange is substantially free from preloaded compression when the frame-like members are free from substantial thrusts exerted along the pivotal axis.

References Cited in the file of this patent

UNITED STATES PATENTS

| | | |
|---|---|---|
| 2,171,157 | Mathews | Aug. 29, 1939 |
| 2,273,869 | Julien | Feb. 24, 1942 |